(12) United States Patent
Fu et al.

(10) Patent No.: US 9,400,359 B1
(45) Date of Patent: Jul. 26, 2016

(54) OPTICAL TRANSMITTER PACKAGE STRUCTURE (71) Applicant: LuxNet Corporation, Zhongli, Taoyuan County (TW)

(72) Inventors: Chung Hsin Fu, Zhongli (TW); Ya Chuan Lin, Zhongli (TW); Shu Chun Chang, Zhongli (TW); Yun Cheng Huang, Zhongli (TW); Hua Hsin Su, Zhongli (TW)

(73) Assignee: Luxnet Corporation, Zhongli, Taoyuan County (TW)

( * ) Notice: Subject to any disclaimer, the term of this patent is extended or adjusted under 35 U.S.C. 154(b) by 0 days.

(21) Appl. No.: 14/707,743

(22) Filed: May 8, 2015

(30) Foreign Application Priority Data

Mar. 5, 2015 (TW) .............................. 104203265 U (51) Int. Cl.
G02B 6/42 (2006.01)
(52) U.S. Cl.
CPC ............ *G02B 6/4244* (2013.01); *G02B 6/4206* (2013.01); *G02B 6/4296* (2013.01); *G02B 6/4284* (2013.01)

(58) Field of Classification Search
CPC .......................... G02B 6/4244; G02B 6/4296
See application file for complete search history.

(56) References Cited

U.S. PATENT DOCUMENTS

| 2013/0093071 A1* | 4/2013 | Tanaka | H01L 23/495 257/666 |
| 2013/0156375 A1* | 6/2013 | Koike | G02B 6/4204 385/33 |
| 2015/0253520 A1* | 9/2015 | Huang | G02B 6/4206 385/90 |

* cited by examiner

*Primary Examiner* — Jerry Rahll
(74) *Attorney, Agent, or Firm* — Muncy, Geissler, Olds & Lowe, P.C.

(57) ABSTRACT

An optical transmitter package structure, comprising: a base, a circuit substrate, and a cylindrical light-coupling mechanism. The optical transmitter package structure of the present invention has following advantageous effects: once the packaging process of the optical transmitter of the present invention is completed, the resulting structure is compact and airtight. Consequently, the optical transmitter is well protected against moisture during use and has a long service life; the optical transmitter of the present invention has a sturdy overall structure which is resistant to damage by improper operation during assembly.

14 Claims, 10 Drawing Sheets

OPTICAL TRANSMITTER PACKAGE STRUCTURE

BACKGROUND OF THE INVENTION

1. Technical Field

The present invention relates to an optical transmitter package structure and, more particularly, to an improved optical transmitter package structure which is applicable to wavelength-division multiplexing (WDM) and is individually detachable for replacement.

2. Description of Related Art

The processing speed and processing capacity of computers are increasing with the rapid development of technology. Limited by bandwidths and data transfer rates, the conventional telecommunication transmission techniques have had problem coping with the vast amount of information in modern society. To accelerate data transfer, fiber-optic communication systems have gradually superseded the traditional copper wire communication systems. Fiber-optic communication systems have extremely large communication bandwidths and have such advantageous features over the traditional copper wire communication systems as high data transfer rates, long transmission distances, and robustness against electromagnetic interference. In fact, fiber-optic communication has been the mainstream of wired communication since its commercialization.

The so-called optical communication technology uses light waves as the signal carrier and implements data transmission between two nodes via optical fibers. An optical communication system can be generally divided by transmission medium into an optical communication side and an electrical communication side. An optical transceiver either converts the optical signal received into an electrical signal to be processed by a chip, or converts the processed electrical signal into an optical signal to be transmitted via an optical fiber, thereby achieving the objective of communication.

A significant advancement in fiber-optic communication systems took place in the fourth-generation systems, in which the use of optical amplifiers reduces the demand for relays while wavelength-division multiplexing (WDM) increases transfer rates substantially. WDM is a technique in which at least two optical signals simultaneously transmitted in a single channel are filtered in order to carry out multiplexing and demultiplexing. Basically, WDM involves a plurality of lasers emitting laser beams of different wavelengths into a single optical fiber, and each signal is transmitted in a unique color band after data modulation.

Simply put, WDM is performed by dividing the working wavelength of an optical fiber into several channels so that more data can be transmitted through the same optical fiber. A complete WDM system includes a wavelength division multiplexer at the transmitting end and a wavelength division demultiplexer at the receiving end. Typically, an optical transmitter for use in WDM is manufactured by packaging a plurality of laser semiconductors into one module. Therefore, if any component of an optical transmitter module is damaged or found to be defective (NG) during the manufacturing process, the entire optical transmitter module must be replaced, which is obviously uneconomical.

BRIEF SUMMARY OF THE INVENTION

To solve the issue stated above, it is an objective of the present invention to provide an optical transmitter package structure, comprising: a base, a circuit substrate, and a cylindrical light-coupling mechanism. The base comprising a flat surface portion carrying a laser semiconductor, a positioning ring provided on a side of and perpendicular to the flat surface portion, and a package housing covering the flat surface portion, wherein the positioning ring is integrally formed with the flat surface portion by milling, and the positioning ring is provided therein with an annular channel in communication with the flat surface portion and corresponding in position to the laser semiconductor. The circuit substrate comprising a substrate body provided with a printed circuit and lying flat on the flat surface portion, an electrical connection side extending from the substrate body toward an interior of the package housing in order for the laser semiconductor to be bonded to the printed circuit, and an electrical connection port extending outward of the package housing from an opposite end of the substrate body in order to connect with an external substrate. The cylindrical light-coupling mechanism comprising a lens holder mounted on a side of the positioning ring, an optical length adjusting element provided on a side of the lens holder, and an optical fiber butt-coupling element provided on the optical length adjusting element, wherein the lens holder has an outer periphery provided with an annular positioning portion connected with an outer periphery of the positioning ring, the lens holder is mounted therein with a spherical lens corresponding to the annular channel, the optical length adjusting element has a side provided with a flat surface connected with a flat surface of the lens holder that corresponds to a periphery of the spherical lens, the optical length adjusting element has an open opposite side forming an adjusting space, the optical fiber butt-coupling element has a side provided with a cylindrical body placed in the adjusting space, the cylindrical body is fixed in position by soldering after being properly moved axially in the adjusting space, the optical fiber butt-coupling element is provided therein with an optical isolator corresponding in position to the spherical lens and an optical channel corresponding to the optical isolator, and either the optical channel or the optical isolator has an end provided with an optical connection port for connecting with an external optical fiber.

Preferably, the flat surface portion and the positioning ring are integrally formed of metal and have a surface electroplated with gold and nickel.

Preferably, the package housing is provided with a step where the package housing is connected with the flat surface portion, and the step rests on an edge of the flat surface portion.

Preferably, the lens holder has a lens positioning hole in which the spherical lens is provided; the lens positioning hole corresponds in shape to the spherical lens, is circular, and has a radius smaller than a radius of the spherical lens in order to achieve a tight fit between the spherical lens and a periphery of the lens positioning hole; and an adhesive sealant is applied to a junction of the spherical lens and the periphery of the lens positioning hole for airtightness.

Preferably, a flat surface of the lens holder that is adjacent to the periphery of the spherical lens is connected to the flat surface on the side of the optical length adjusting element by soldering, and an adhesive sealant is applied to a junction of the flat surfaces for airtightness.

Preferably, the cylindrical body of the optical fiber butt-coupling element is connected to a peripheral wall of the adjusting space of the optical length adjusting element by soldering once adjusted to an appropriate position relative to the adjusting space, and an adhesive sealant is applied to a junction of the cylindrical body and the peripheral wall of the adjusting space for airtightness.

Preferably, the optical fiber butt-coupling element has an outer periphery provided with a fixing ring to be fixed to an external housing or the external substrate.

Another objective of the present invention to provide an optical transmitter package structure, comprising: a base, a flat surface portion and a circuit substrate. The base comprising a flat surface portion carrying a laser semiconductor, a positioning ring provided on a side of and perpendicular to the flat surface portion, and a package housing covering the flat surface portion, wherein the positioning ring is provided with a lens positioning hole in which a spherical lens is provided and which corresponds in position to the laser semiconductor. The circuit substrate comprising a substrate body provided with a printed circuit and lying flat on the flat surface portion, an electrical connection side extending from the substrate body toward an interior of the package housing in order for the laser semiconductor to be bonded to the printed circuit, and an electrical connection port extending outward of the package housing from an opposite end of the substrate body in order to connect with an external substrate. The cylindrical light-coupling mechanism comprising: an optical length adjusting element connected to a side of the positioning ring, and an optical fiber butt-coupling element provided on the optical length adjusting element, wherein the optical length adjusting element has a side provided with a flat surface connected with a flat surface of the positioning ring that corresponds to a periphery of the spherical lens, the optical length adjusting element has an open opposite side forming an adjusting space, the optical fiber butt-coupling element has a side provided with a cylindrical body placed in the adjusting space, the cylindrical body is fixed in position by soldering after being properly moved axially in the adjusting space, the optical fiber butt-coupling element is provided therein with an optical isolator corresponding in position to the spherical lens and an optical channel corresponding to the optical isolator, and either the optical channel or the optical isolator has an end provided with an optical connection port for connecting with an external optical fiber.

Preferably, the flat surface portion and the positioning ring are integrally formed of metal and have a surface electroplated with gold and nickel.

Preferably, the package housing is provided with a step where the package housing is connected with the flat surface portion, and the step rests on an edge of the flat surface portion.

Preferably, the lens positioning hole of the positioning ring corresponds in shape to the spherical lens, is circular, and has a radius smaller than a radius of the spherical lens in order to create a tight fit between the spherical lens and a periphery of the lens positioning hole; and an adhesive sealant is applied to a junction of the spherical lens and the periphery of the lens positioning hole for airtightness.

Preferably, a flat surface of the positioning ring that is adjacent to the periphery of the spherical lens is connected to the flat surface on the side of the optical length adjusting element by soldering, and an adhesive sealant is applied to a junction of the flat surfaces for airtightness.

Preferably, the cylindrical body of the optical fiber butt-coupling element is connected to a peripheral wall of the adjusting space of the optical length adjusting element by soldering once adjusted to an appropriate position relative to the adjusting space, and an adhesive sealant is applied to a junction of the cylindrical body and the peripheral wall of the adjusting space for airtightness.

Preferably, the optical fiber butt-coupling element has an outer periphery provided with a fixing ring to be fixed to an external housing or the external substrate.

The present invention has the following advantageous effects:

1. Once the packaging process of the optical transmitter of the present invention is completed, the resulting structure is compact and airtight. Consequently, the optical transmitter is well protected against moisture during use and has a long service life.

2. The optical transmitter of the present invention has a sturdy overall structure which is resistant to damage by improper operation during assembly.

DETAILED DESCRIPTION OF THE INVENTION

The structural features and mode of operation of the present invention will be detailed hereinafter with reference to some preferred embodiments and the accompanying drawings. Please note that the drawings are provided only to facilitate description and are not necessarily drawn to scale. Certain elements in the drawings may even be exaggerated for illustration purposes. The drawings and the proportions of the elements in the drawings should not be construed as restrictive of the scope of the present invention.

Figure 1:
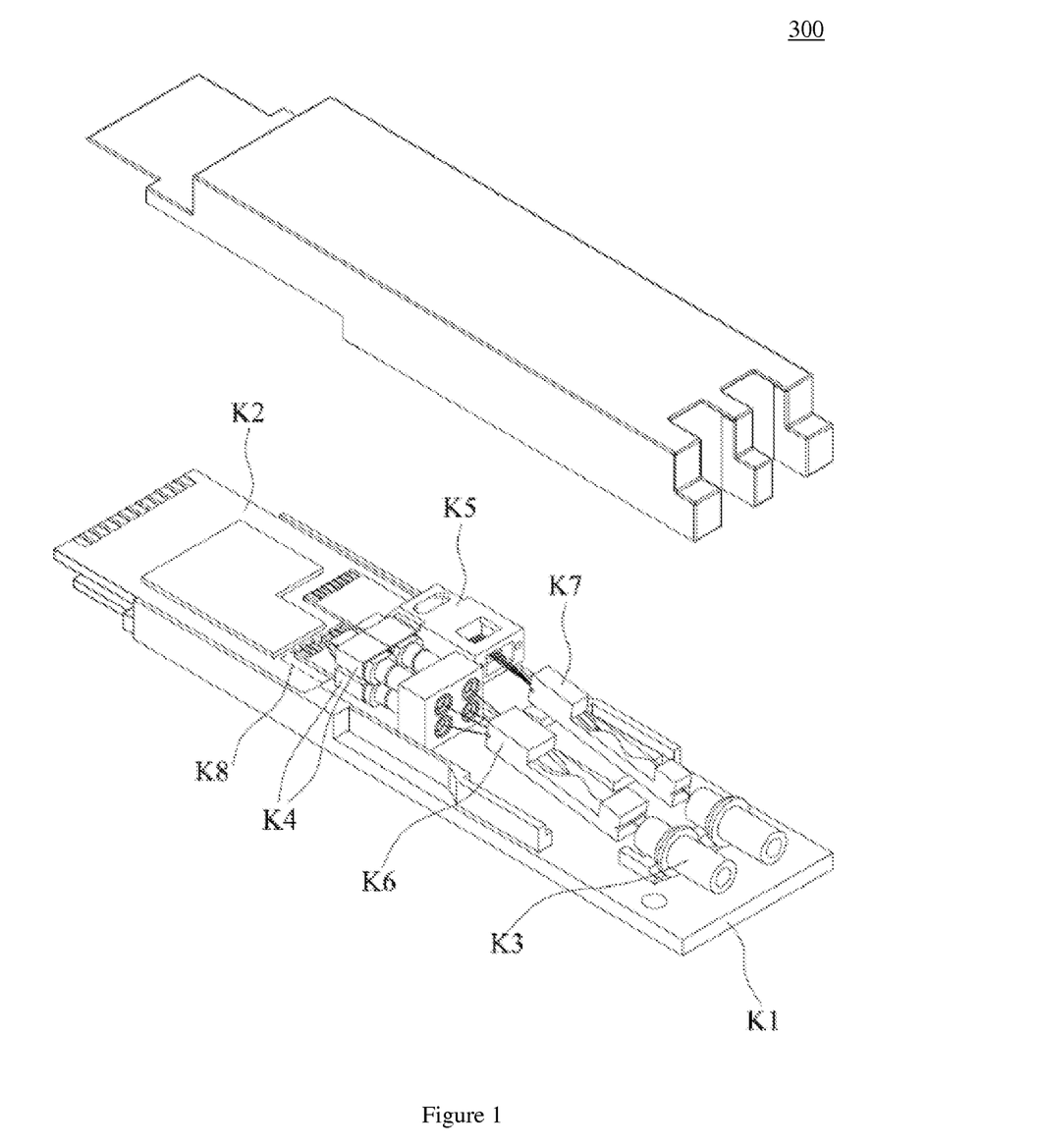
FIG. 1 is a perspective view of an optical transceiver module.

Please refer to FIG. 1 for a perspective view of an optical transceiver module.

As shown in FIG. 1, the optical transceiver module 300 has a connection port conforming to the LC (Lucent connector/local connector) specifications. The optical transceiver module 300 essentially includes a housing K1, a substrate K2 provided on the housing K1, an LC connection port K3 (including a transmitting end T1 and a receiving end R1) provided at one end of the housing K1 and configured for connecting with an LC plug, a plurality of optical transmitters K4, an optical receiver K5, a wavelength division multiplexer K6 provided between the optical transmitters K4 and the transmitting end of the LC connection port K3, and a wavelength division demultiplexer K7 provided between the optical receiver K5 and the receiving end of the LC connection port K3. The housing K1 carries the aforementioned electronic components and mechanisms and serves to block electromagnetic interference (EMI) from the internal electronic components and reduce electromagnetic susceptibility (EMS). The housing K1 is designed according to the specifications established by the US Federal Communications Commission (FCC). The substrate K2 (external substrate) is provided with a printed circuit, solder joints, edge connectors connected to the circuit, and a chip for signal processing. In addition, the substrate K2 has an electrical connection unit K8 connected to the optical transmitters K4 and the optical receiver K5. The electrical connection unit K8 may be solder joints to which the optical transmitters K4 and the optical receiver K5 are soldered. Alternatively, the electrical connection unit K8 may be sockets each provided with a metal terminal for connecting with a lateral connecting feature of one of the optical transmitters K4 or the optical receiver K5. The present invention imposes no limitations on the configuration of the electrical connection unit K8. The wavelength division multiplexer K6 and the wavelength division demultiplexer K7 apply the WDM technique and work in the following manner. The plural optical transmitters K4 introduce light of different wavelengths through the wavelength division multiplexer K6 into a single-mode optical fiber so that the light can be transmitted in the single-mode optical fiber over a medium to long distance. On the other hand, the wavelength division de-multiplexer K7 splits the optical signal to be received by the optical receiver K5 so that the split signal can be guided to different channels.

Figure 2:
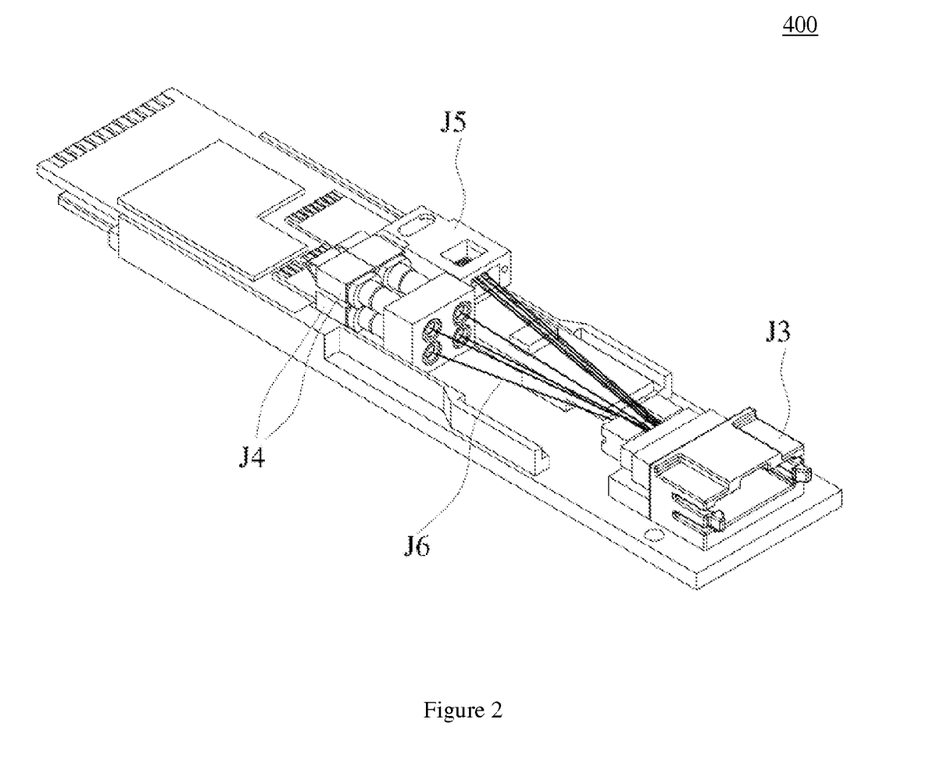
FIG. 2 is a perspective view of another optical transceiver module.
Figure 3:
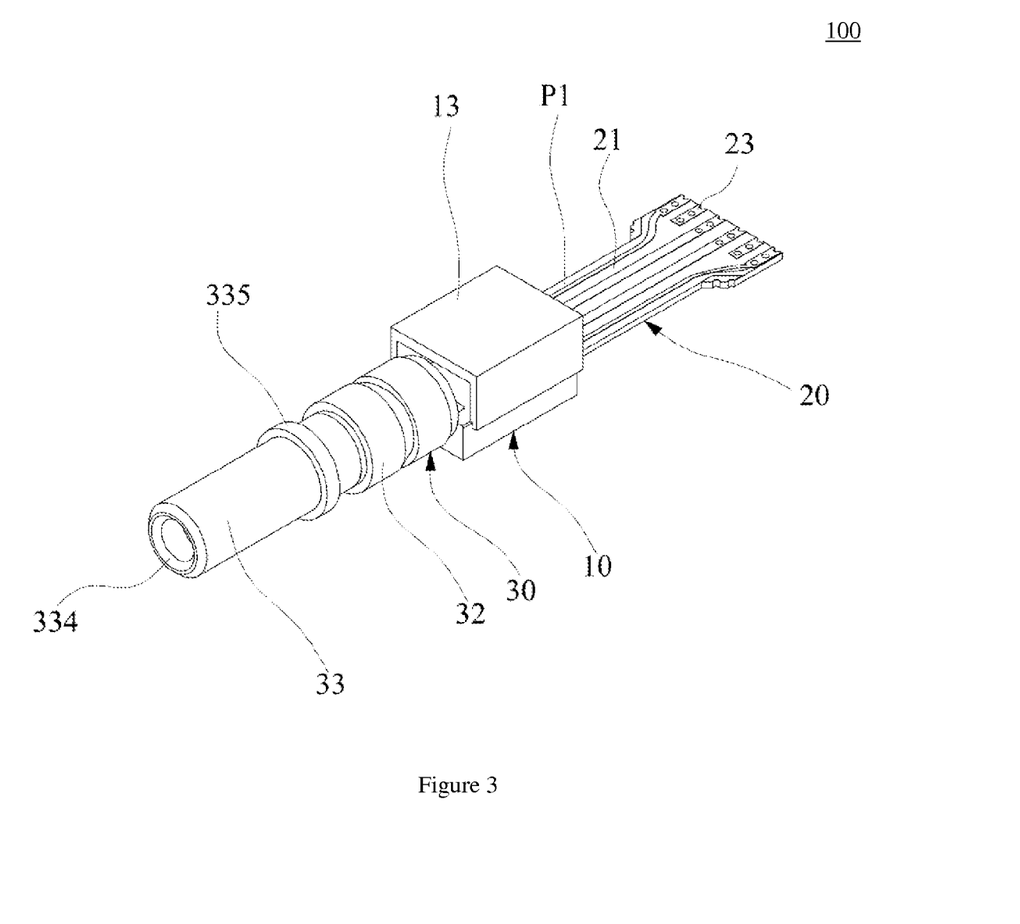
FIG. 3 is an assembled perspective view of the first embodiment of the present invention.
Figure 4:
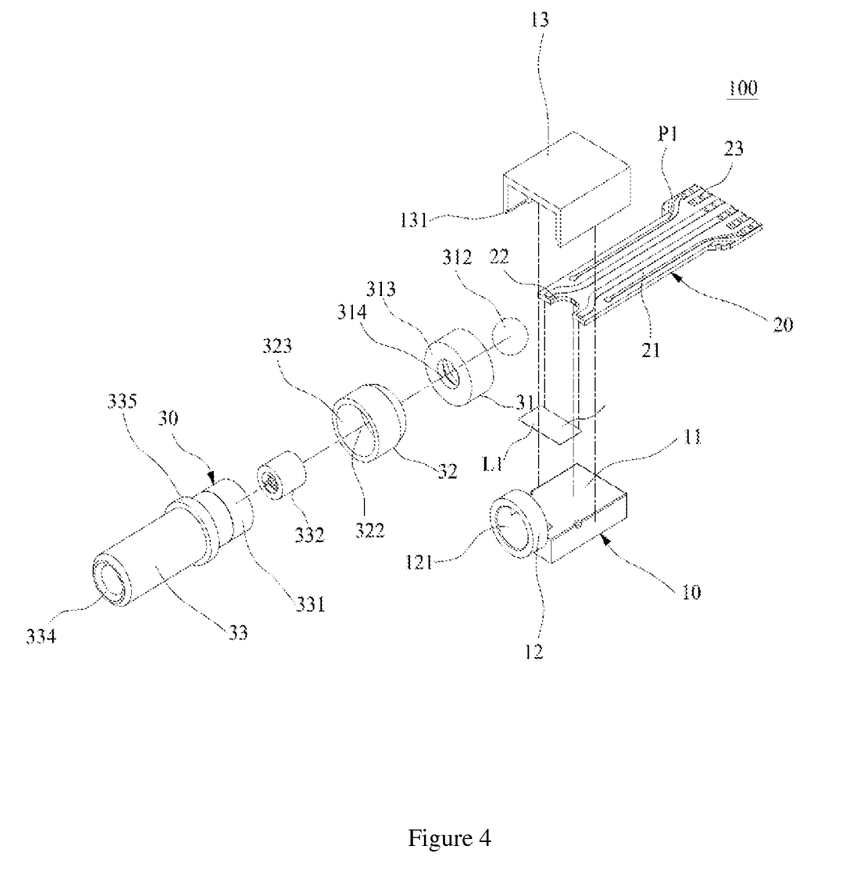
FIG. 4 is an exploded perspective view of the first embodiment of the present invention.
Figure 5:
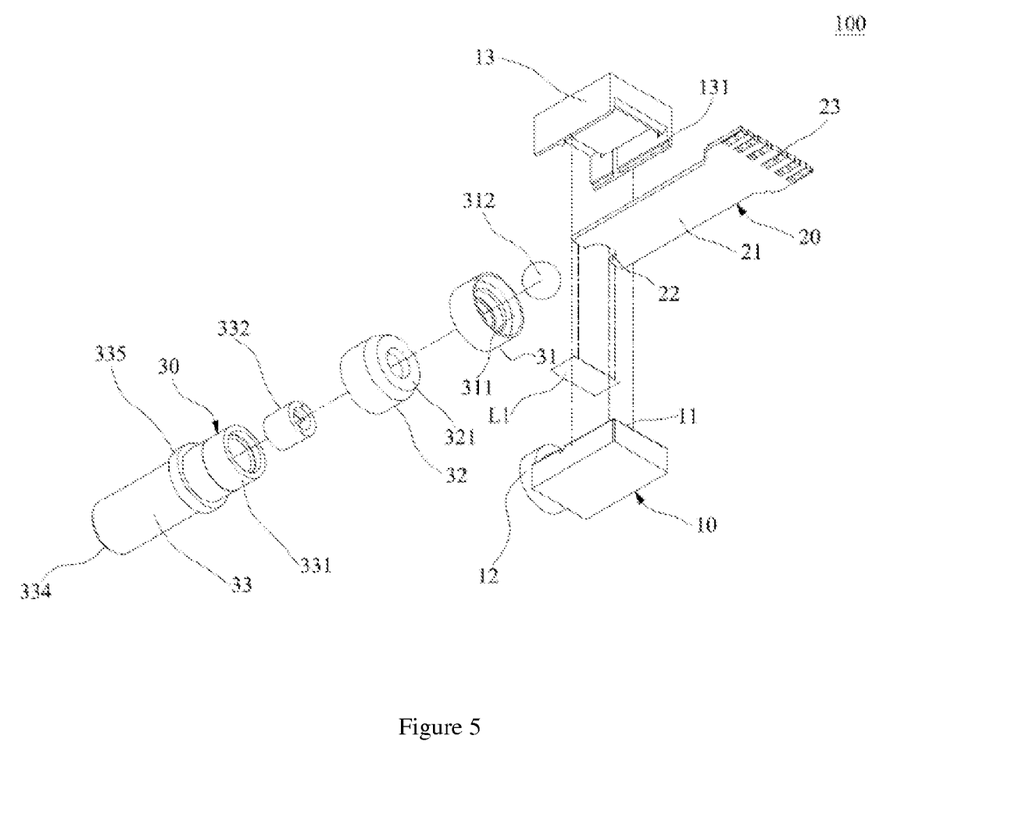
FIG. 5 is another exploded perspective view of the first embodiment of the present invention.
Figure 6:
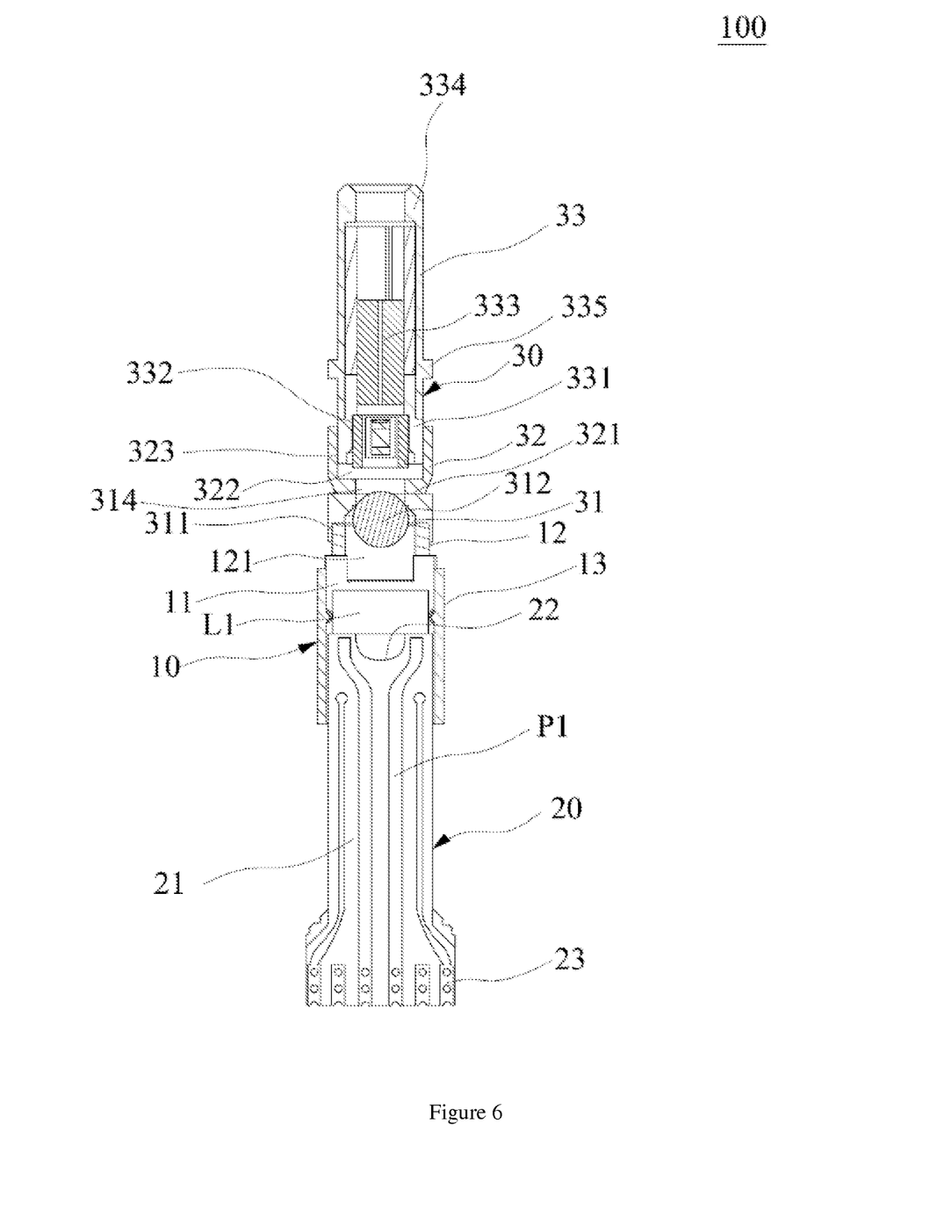
FIG. 6 is a sectional top view of the first embodiment of the present invention.
Figure 7:
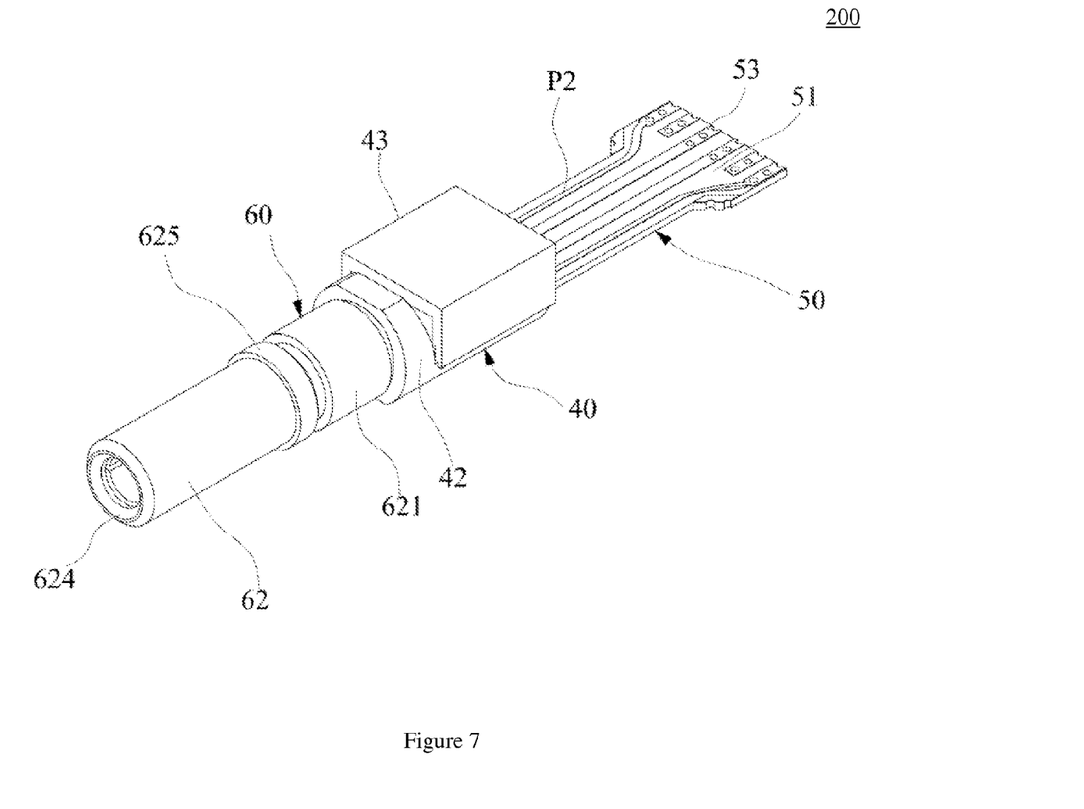
FIG. 7 is an assembled perspective view of the second embodiment of the present invention.
Figure 8:
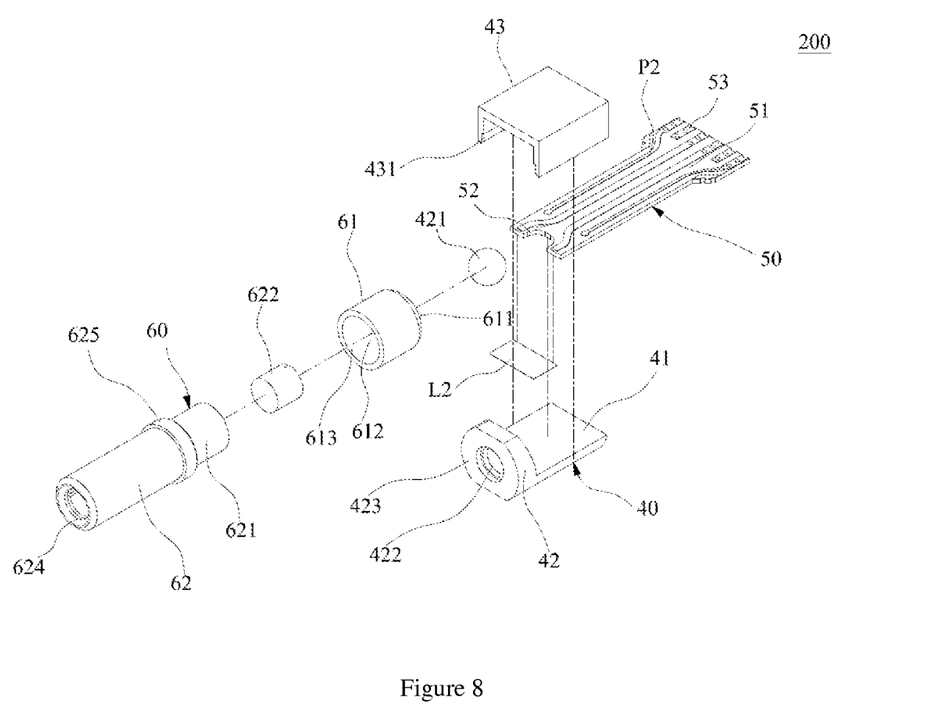
FIG. 8 is an exploded perspective view of the second embodiment of the present invention.
Figure 9:
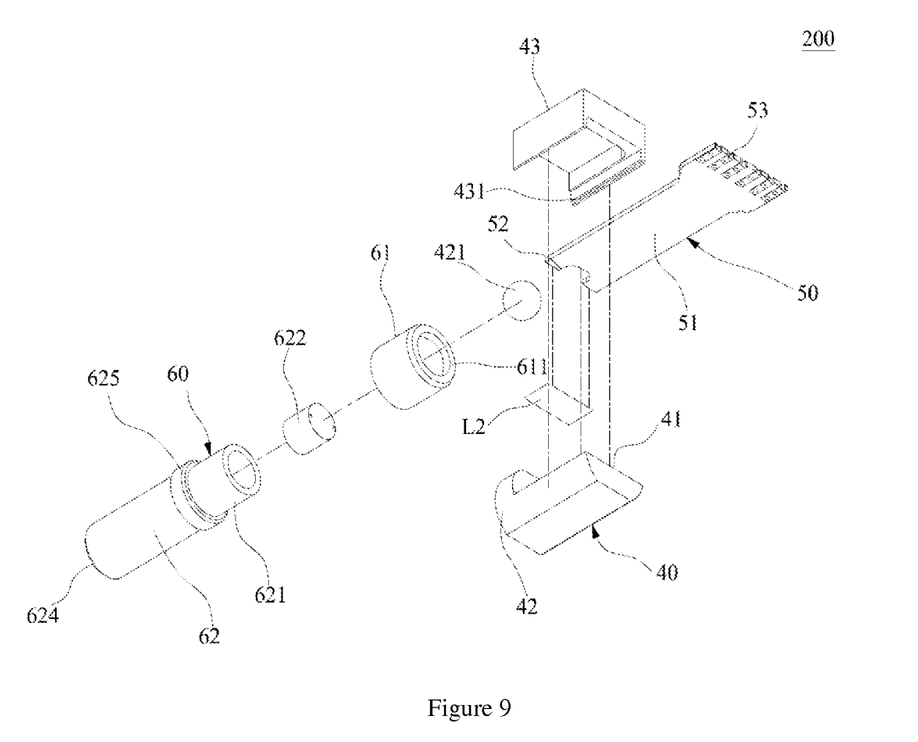
FIG. 9 is another exploded perspective view of the second embodiment of the present invention.
Figure 10:
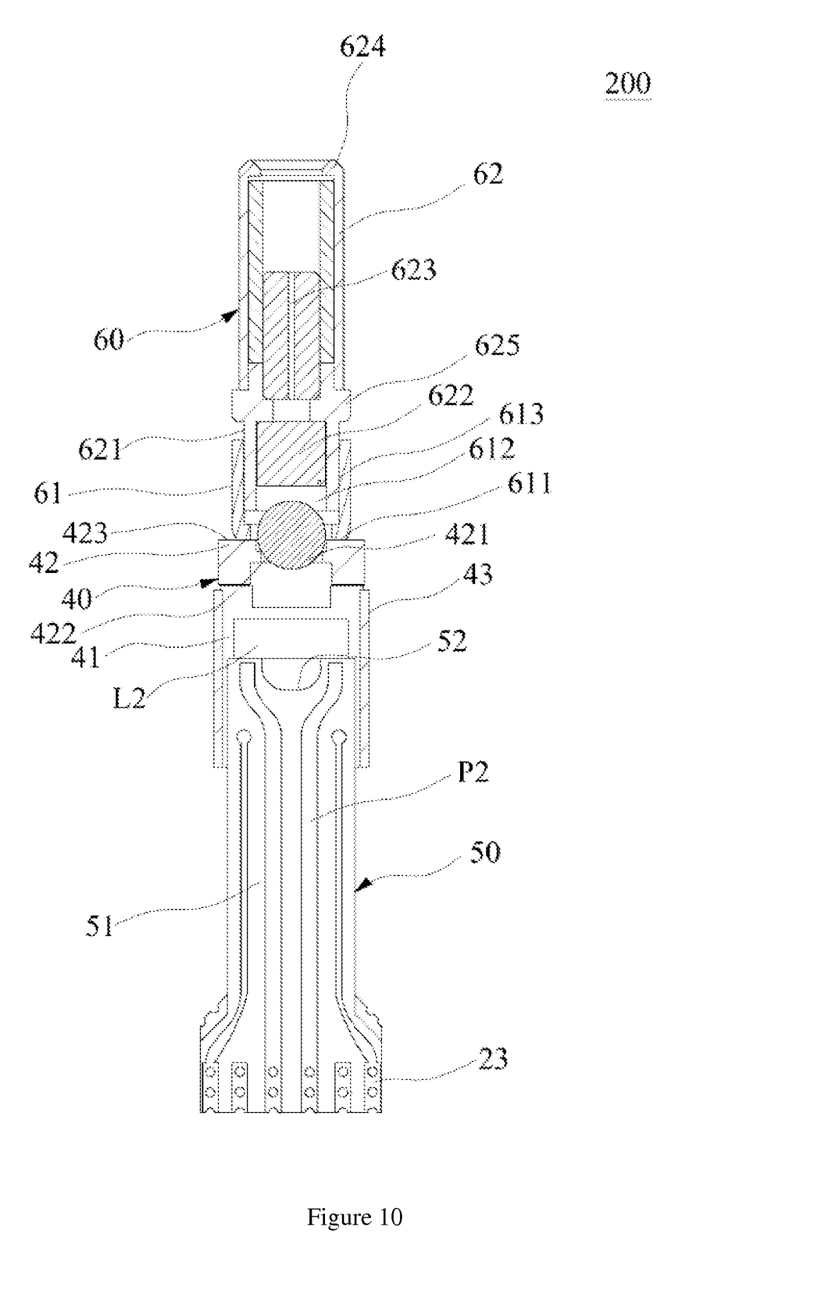
FIG. 10 is a sectional top view of the second embodiment of the present invention.

FIG. 2 shows another optical transceiver module in perspective view.

As shown in FIG. 2, the optical transceiver module 400 has a connection port conforming to the MPO (Multi-Fiber Push On) specifications. Here, optical fibers are butt-coupled in a one-to-one manner to form different channels. More specifically, the internal optical fibers J6 serve as independent channels for connecting the optical transmitters J4 and the optical receiver J5 to the MPO connector J3 separately. Light splitting and light recombination are therefore unnecessary.

In addition to the optical transceiver modules described above, the present invention is applicable to binary phase-shift keying (BPSK), quadrature phase-shift keying (QPSK), conventional/coarse wavelength division multiplexing (CWDM), dense wavelength division multiplexing (DWDM), optical add/drop multiplexing (OADM), reconfigurable optical add/drop multiplexing (ROADM), and like optical communication techniques, without limitation.

The present invention provides an improved optical transmitter structure for use in the foregoing optical transceiver modules 300 and 400. The optical transmitters 100 and 200 of the present invention (equivalent to the optical transmitters K4 and J4, to be detailed below) can be installed in the optical transceiver modules 300 and 400, with one end connected to the substrate K2 (external substrate) and electrically connected to an external circuit (e.g., an optical amplifier, signal generator, etc.), in order to transmit a processed signal through a laser semiconductor to an external optical fiber, thereby achieving optical communication. To illustrate the claimed equivalent scopes of the present invention, two different embodiments are described below by way of example.

Embodiment 1

Please refer to FIG. 3 to FIG. 6 respectively for an assembled perspective view, two exploded perspective views, and a sectional top view of the first embodiment of the present invention.

In this embodiment, the optical transmitter 100 includes a base 10, a circuit substrate 20 provided on the base 10, and a cylindrical light-coupling mechanism 30 provided on one side of the base 10.

The base 10 includes a flat surface portion 11 carrying a laser semiconductor L1, a positioning ring 12 provided on one side of the flat surface portion 11 and perpendicular to the flat surface portion 11, and a package housing 13 covering the flat surface portion 11. The positioning ring 12 is integrally formed with the flat surface portion 11 by milling. The positioning ring 12 defines an annular channel 121 in communication with the flat surface portion 11 and corresponding in position to the laser semiconductor L1. The flat surface portion 11 and the positioning ring 12 are integrally formed of metal and have a surface electroplated with gold and nickel or with a passive metal such as palladium for higher overall resistance to corrosion. The package housing 13 is provided with a step 131 where the package housing 13 connects with the flat surface portion 11, and the step 131 is designed to rest on an edge of the flat surface portion 11. A sealing compound can be applied to the step 131 when the package housing 13 is being assembled to the flat surface portion 11, thereby securing the package housing 13 to the flat surface portion 11.

The circuit substrate 20 includes a substrate body 21 provided with a printed circuit P1 and lying flat on the flat surface portion 11, an electrical connection side 22 extending from the substrate body 21 toward the interior of the package housing 13 so that the laser semiconductor L1 can be bonded to the printed circuit P1, and an electrical connection port 23 extending outward of the package housing 13 from the opposite end of the substrate body 21 in order to connect with the substrate K2. The circuit substrate 20 can be a common printed circuit board (PCB), flexible printed circuit board (FPC), ceramic PCB, or the like, without limitation. The electrical connection port 23 is provided with a plurality of metal contacts to be connected with the substrate K2 by electric welding for example. If the circuit substrate 20 is a rigid PCB or ceramic PCB, the electrical connection port 23 may also be an edge connector to be inserted into and thus connected with a socket on the substrate K2.

The cylindrical light-coupling mechanism 30 includes a lens holder 31 mounted on one side of the positioning ring 12, an optical length adjusting element 32 provided on one side of the lens holder 31, and an optical fiber butt-coupling element 33 provided on the optical length adjusting element 32. To fix the cylindrical light-coupling mechanism 30 to the housing K1, a fixing ring 335 is provided on the outer periphery of the optical fiber butt-coupling element 33 and configured to be secured to an external housing or external substrate. The outer periphery of the lens holder 31 is provided with an annular positioning portion 311 to be connected with the outer periphery of the positioning ring 12. The annular positioning portion 311 defines a space in which the positioning ring 12 can be mounted so that the annular positioning portion 311 and the positioning ring 12 are fixed to each other. The annular positioning portion 311 is sized to interfere with the positioning ring 12 to a certain degree in order to create a tight fit between the annular positioning portion 311 and the positioning ring 12. Once the annular positioning portion 311 and the positioning ring 12 are connected, they can be fixed together by electric welding, with an adhesive sealant applied to the junction to ensure airtightness.

A spherical lens 312 is mounted in the lens holder 31 and corresponds to the annular channel 121. In order to fix the spherical lens 312 with ease and enhance overall airtightness, the lens holder 31 has a lens positioning hole 314 in which the spherical lens 312 can rest. The lens positioning hole 314 corresponds in shape to the spherical lens 312 and is therefore circular, with a radius smaller than that of the spherical lens 312 to enable a tight fit between the spherical lens 312 and the periphery of the lens positioning hole 314. Also, an adhesive sealant is applied to the junction of the spherical lens 312 and the periphery of the lens positioning hole 314 for airtightness.

The optical length adjusting element 32 has a flat surface 321 on one side. The flat surface 321 is to connect with a flat surface 313 of the lens holder 31 that corresponds to the periphery of the spherical lens 312. The opposite side of the optical length adjusting element 32 is open and forms an adjusting space 322. The optical fiber butt-coupling element 33 has a cylindrical body 331 on one side. The cylindrical body 331 is designed to be inserted into the adjusting space 322 and, after being properly moved in the adjusting space 322 in the axial direction, be fixed in place by soldering. During assembly, the cylindrical body 331 of the optical fiber butt-coupling element 33 is adjusted to an appropriate position relative to the adjusting space 322 of the optical length adjusting element 32 and then soldered to the peripheral wall 323 of the adjusting space 322, with an adhesive sealant applied to the junction of the cylindrical body 331 and the peripheral wall 323 for airtightness.

An optical isolator 332 is provided in the optical fiber butt-coupling element 33 and corresponds in position to the spherical lens 313. Also provided in the optical fiber butt-coupling element 33 is an optical channel 333 corresponding to the optical isolator 332. An optical connection port 334 is provided at one end of either the optical channel 333 or the optical isolator 332 and is configured to connect with an external optical fiber. In this embodiment, the optical isolator 332 is provided at a position inward of the optical channel 333. In practice, however, the optical isolator 332 may alternatively be provided outward of the optical channel 333, i.e., at a position adjacent to the optical connection port 334 shown in FIG. 3 to FIG. 6. The present invention imposes no limitations on the relative positions of the optical isolator 332 and the optical channel 333.

Embodiment 2

Please refer to FIG. 7 to FIG. 10 respectively for an assembled perspective view, two exploded perspective views, and a sectional top view of the second embodiment of the present invention.

As shown in FIG. 7 to FIG. 10, the second embodiment provides an improved optical transmitter package structure 200 which includes a base 40, a circuit substrate 50 provided on the base 40, and a cylindrical light-coupling mechanism 60 provided on one side of the base 40.

The base 40 includes a flat surface portion 41 carrying a laser semiconductor L2, a positioning ring 42 provided on one side of and perpendicular to the flat surface portion 41, and a package housing 43 covering the flat surface portion 41. The positioning ring 42 is provided with a lens positioning hole 422 in which a spherical lens 421 can be placed and which corresponds in position to the laser semiconductor L2. The flat surface portion 11 and the positioning ring 12 are integrally formed of metal and have a surface electroplated with gold and nickel or with a passive metal such as palladium for higher overall resistance to corrosion. The package housing 43 is provided with a step 431 where the package housing 43 connects with the flat surface portion 41, and the step 431 is designed to rest on an edge of the flat surface portion 41. When the package housing 43 is being assembled to the flat surface portion 41, a sealing compound can be applied to the step 431 to fix the package housing 43 and the flat surface portion 41 together. In order to achieve a higher degree of airtightness, the lens positioning hole 422 of the positioning ring 42 in this embodiment corresponds in shape to the spherical lens 421 and is therefore circular, and the radius of the lens positioning hole 422 is smaller than that of the spherical lens 421, allowing a tight fit to be created between the spherical lens 421 and the periphery of the lens positioning hole 422. In addition, an adhesive sealant is applied to the junction of the spherical lens 421 and the periphery of the lens positioning hole 422 for airtightness. The positioning ring 42 has a flat surface 423 which is adjacent to the periphery of the spherical lens 421 and which is soldered to a flat surface 611 on one side of an optical length adjusting element 61. An adhesive sealant is also applied to the junction of the two flat surfaces for airtightness.

The circuit substrate 50 includes a substrate body 51 provided with a printed circuit P2 and lying flat on the flat surface portion 41, an electrical connection side 42 extending from the substrate body 51 toward the interior of the package housing 43 so that the laser semiconductor L2 can be bonded to the printed circuit P2, and an electrical connection port 53 extending outward of the package housing 43 from the opposite end of the substrate body 51 in order to connect with an external substrate. The circuit substrate can be a common PCB, FPC, ceramic PCB, or the like, without limitation. The electrical connection port 53 has a plurality of metal contacts to be connected with the substrate K2 by electric welding. If the circuit substrate 50 is a rigid PCB or ceramic PCB, the electrical connection port 53 may also be an edge connector to be inserted in and thereby connected with a socket on the substrate K2.

The cylindrical light-coupling mechanism 60 includes the optical length adjusting element 61, which is connected to one side of the positioning ring 42; and an optical fiber butt-coupling element 62 provided on the optical length adjusting element 61. To fix the cylindrical light-coupling mechanism 60 to the housing K1, the outer periphery of the optical fiber butt-coupling element 62 is provided with a fixing ring 625 configured to be fixed to an external housing or external substrate. The optical length adjusting element 61 has a flat surface 611 on one side and is open on the opposite side, wherein the flat surface 611 is connected with the flat surface 423 of the positioning ring 42 that corresponds to the periphery of the spherical lens 421 while the open side forms an adjusting space 612. The optical fiber butt-coupling element 62 has a cylindrical body 621 on one side. The cylindrical body 621 is designed to be put in the adjusting space 612 and is fixed in position by soldering after being properly moved in the adjusting space 612 in the axial direction. More specifically, once the cylindrical body 621 of the optical fiber butt-coupling element 62 is adjusted to an appropriate position relative to the adjusting space 612 of the optical length adjusting element 61, the cylindrical body 621 is soldered to the peripheral wall 613 of the adjusting space 612, with an adhesive sealant applied to the junction of the cylindrical body 621 and the peripheral wall 613 for airtightness.

An optical isolator 622 and an optical channel 623 are provided in the optical fiber butt-coupling element 62. The optical isolator 622 corresponds in position to the spherical lens 421 while the optical channel 623 corresponds to the optical isolator 622. One end of either the optical channel 623 or the optical isolator 622 is provided with an optical connection port 624 for connecting with an external optical fiber. In this embodiment, the optical isolator 622 is provided inward of the optical channel 623, but in practice, it is also feasible that the optical isolator 622 is provided outward of the optical channel 623, i.e., at a position adjacent to the optical connection port 624 shown in FIG. 7 to FIG. 10. The present invention imposes no limitations on the relative positions of the optical isolator 622 and the optical channel 623.

According to the above, once the packaging process of the optical transmitter of the present invention is completed, the resulting structure is compact and airtight. Consequently, the optical transmitter is well protected against moisture during use and has a long service life. The optical transmitter of the present invention has a sturdy overall structure which is resistant to damage by improper operation during assembly.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. An optical transmitter package structure, comprising:
    a base comprising: a flat surface portion carrying a laser semiconductor, a positioning ring provided on a side of and perpendicular to the flat surface portion, and a package housing covering the flat surface portion, wherein the positioning ring is integrally formed with the flat surface portion by milling, and the positioning ring is provided therein with an annular channel in communication with the flat surface portion and corresponding in position to the laser semiconductor;
    a circuit substrate comprising: a substrate body provided with a printed circuit and lying flat on the flat surface portion, an electrical connection side extending from the substrate body toward an interior of the package housing in order for the laser semiconductor to be bonded to the printed circuit, and an electrical connection port extending outward of the package housing from an opposite end of the substrate body in order to connect with an external substrate; and
    a cylindrical light-coupling mechanism comprising: a lens holder mounted on a side of the positioning ring, an optical length adjusting element provided on a side of the lens holder, and an optical fiber butt-coupling element provided on the optical length adjusting element, wherein the lens holder has an outer periphery provided with an annular positioning portion connected with an outer periphery of the positioning ring, the lens holder is mounted therein with a spherical lens corresponding to the annular channel, the optical length adjusting element has a side provided with a flat surface connected with a flat surface of the lens holder that corresponds to a periphery of the spherical lens, the optical length adjusting element has an open opposite side forming an adjusting space, the optical fiber butt-coupling element has a side provided with a cylindrical body placed in the adjusting space, the cylindrical body is fixed in position by soldering after being properly moved axially in the adjusting space, the optical fiber butt-coupling element is provided therein with an optical isolator corresponding in position to the spherical lens and an optical channel corresponding to the optical isolator, and either the optical channel or the optical isolator has an end provided with an optical connection port for connecting with an external optical fiber.

2. The optical transmitter package structure of claim 1, wherein the flat surface portion and the positioning ring are integrally formed of metal and have a surface electroplated with gold and nickel.

3. The optical transmitter package structure of claim 1, wherein the package housing is provided with a step where the package housing is connected with the flat surface portion, and the step rests on an edge of the flat surface portion.

4. The optical transmitter package structure of claim 1, wherein the lens holder has a lens positioning hole in which the spherical lens is provided; the lens positioning hole corresponds in shape to the spherical lens, is circular, and has a radius smaller than a radius of the spherical lens in order to achieve a tight fit between the spherical lens and a periphery of the lens positioning hole; and an adhesive sealant is applied to a junction of the spherical lens and the periphery of the lens positioning hole for airtightness.

5. The optical transmitter package structure of claim 1, wherein a flat surface of the lens holder that is adjacent to the periphery of the spherical lens is connected to the flat surface on the side of the optical length adjusting element by soldering, and an adhesive sealant is applied to a junction of the flat surfaces for airtightness.

6. The optical transmitter package structure of claim 1, wherein the cylindrical body of the optical fiber butt-coupling element is connected to a peripheral wall of the adjusting space of the optical length adjusting element by soldering once adjusted to an appropriate position relative to the adjusting space, and an adhesive sealant is applied to a junction of the cylindrical body and the peripheral wall of the adjusting space for airtightness.

7. The optical transmitter package structure of claim 1, wherein the optical fiber butt-coupling element has an outer periphery provided with a fixing ring to be fixed to an external housing or the external substrate.

8. An optical transmitter package structure, comprising:
    a base comprising: a flat surface portion carrying a laser semiconductor, a positioning ring provided on a side of and perpendicular to the flat surface portion, and a package housing covering the flat surface portion, wherein the positioning ring is provided with a lens positioning hole in which a spherical lens is provided and which corresponds in position to the laser semiconductor;
    a circuit substrate comprising: a substrate body provided with a printed circuit and lying flat on the flat surface portion, an electrical connection side extending from the substrate body toward an interior of the package housing in order for the laser semiconductor to be bonded to the printed circuit, and an electrical connection port extending outward of the package housing from an opposite end of the substrate body in order to connect with an external substrate; and
    a cylindrical light-coupling mechanism comprising: an optical length adjusting element connected to a side of the positioning ring, and an optical fiber butt-coupling element provided on the optical length adjusting element, wherein the optical length adjusting element has a side provided with a flat surface connected with a flat surface of the positioning ring that corresponds to a periphery of the spherical lens, the optical length adjusting element has an open opposite side forming an adjusting space, the optical fiber butt-coupling element has a side provided with a cylindrical body placed in the adjusting space, the cylindrical body is fixed in position by soldering after being properly moved axially in the adjusting space, the optical fiber butt-coupling element is provided therein with an optical isolator corresponding in position to the spherical lens and an optical channel corresponding to the optical isolator, and either the optical channel or the optical isolator has an end provided with an optical connection port for connecting with an external optical fiber.

9. The optical transmitter package structure of claim 8, wherein the flat surface portion and the positioning ring are integrally formed of metal and have a surface electroplated with gold and nickel.

10. The optical transmitter package structure of claim 8, wherein the package housing is provided with a step where the package housing is connected with the flat surface portion, and the step rests on an edge of the flat surface portion.

11. The optical transmitter package structure of claim 8, wherein the lens positioning hole of the positioning ring corresponds in shape to the spherical lens, is circular, and has a radius smaller than a radius of the spherical lens in order to create a tight fit between the spherical lens and a periphery of the lens positioning hole; and an adhesive sealant is applied to a junction of the spherical lens and the periphery of the lens positioning hole for airtightness.

12. The optical transmitter package structure of claim 8, wherein a flat surface of the positioning ring that is adjacent to the periphery of the spherical lens is connected to the flat surface on the side of the optical length adjusting element by soldering, and an adhesive sealant is applied to a junction of the flat surfaces for airtightness.

13. The optical transmitter package structure of claim 8, wherein the cylindrical body of the optical fiber butt-coupling element is connected to a peripheral wall of the adjusting space of the optical length adjusting element by soldering once adjusted to an appropriate position relative to the adjusting space, and an adhesive sealant is applied to a junction of the cylindrical body and the peripheral wall of the adjusting space for airtightness.

14. The optical transmitter package structure of claim 8, wherein the optical fiber butt-coupling element has an outer periphery provided with a fixing ring to be fixed to an external housing or the external substrate.

* * * * *